(12) United States Patent
Kashiyama et al.

(10) Patent No.: US 10,673,833 B2
(45) Date of Patent: Jun. 2, 2020

(54) INFORMATION PROCESSING SYSTEM, SERVER DEVICE, AND METHOD FOR PROCESSING INFORMATION

(71) Applicants: Shigeki Kashiyama, Tokyo (JP);
Hiroki Ohzaki, Kanagawa (JP);
Masato Nakajima, Kanagawa (JP);
Yasuharu Fukuda, Kanagawa (JP)

(72) Inventors: Shigeki Kashiyama, Tokyo (JP);
Hiroki Ohzaki, Kanagawa (JP);
Masato Nakajima, Kanagawa (JP);
Yasuharu Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 226 days.

(21) Appl. No.: 15/229,381

(22) Filed: Aug. 5, 2016

(65) Prior Publication Data
US 2017/0063871 A1 Mar. 2, 2017

(30) Foreign Application Priority Data
Aug. 26, 2015 (JP) ................................ 2015-167215

(51) Int. Cl.
*H04L 29/06* (2006.01)

(52) U.S. Cl.
CPC ...... *H04L 63/0815* (2013.01); *H04L 63/0884* (2013.01); *H04L 63/104* (2013.01); *H04L 63/0853* (2013.01)

(58) Field of Classification Search
CPC . H04L 63/0815; H04L 12/2807; H04L 67/10; H04L 67/12
See application file for complete search history.

(56) References Cited

U.S. PATENT DOCUMENTS 8,762,512 B1 * 6/2014 Sundaram ........... G06F 21/6218
709/223
9,071,601 B2 6/2015 Tamura
(Continued)

FOREIGN PATENT DOCUMENTS

| JP | 2005-309897 | 11/2005 |
| JP | 2013-145505 | 7/2013 |

(Continued)

OTHER PUBLICATIONS

Japanese Office Action for 2015-167215 dated May 28, 2019.

*Primary Examiner* — Daniel B Potratz
*Assistant Examiner* — D'Arcy Winston Straub
(74) *Attorney, Agent, or Firm* — IPUSA, PLLC

(57) ABSTRACT

An information processing system includes a client device and a server device. The client device includes a transmitter that transmits, to the server device, a request to acquire information for connecting to an external device that provides an external service. The server device includes a storage that stores attributes of accounts of the external service, and the information for connecting to the external device by using the accounts; a receiver that receives the acquisition request from the client device; an identifier that identifies candidate accounts to be used when the client device receives the external service, the candidate accounts being identified based on information elements and the attributes, the information elements being included in the acquisition request and identifying the accounts; and a transmitter that transmits, to the client device, the information for connecting to the external device by using the identified candidate accounts.

13 Claims, 13 Drawing Sheets

(56) References Cited

U.S. PATENT DOCUMENTS

| | | | |
|---|---|---|---|
| 9,124,569 B2* | 9/2015 | Hussain | H04L 63/08 |
| 9,197,644 B1* | 11/2015 | Sherman | H04L 63/0807 |
| 9,509,672 B1* | 11/2016 | Barak | H04L 63/0815 |
| 9,608,972 B2 | 3/2017 | Takeuchi | |
| 9,882,887 B2* | 1/2018 | Rykowski | H04L 63/0815 |
| 9,992,186 B1* | 6/2018 | Drozd | H04L 63/0823 |
| 2008/0301784 A1* | 12/2008 | Zhu | H04L 63/0823 726/5 |
| 2013/0091171 A1* | 4/2013 | Lee | G06F 21/41 707/784 |
| 2013/0174237 A1* | 7/2013 | Zises | G06F 21/32 726/7 |
| 2014/0223532 A1* | 8/2014 | Satoh | H04L 63/0815 726/7 |
| 2015/0150106 A1* | 5/2015 | Lund | H04L 63/08 726/7 |
| 2015/0206339 A1* | 7/2015 | Chun | G06T 15/205 345/419 |
| 2016/0087960 A1* | 3/2016 | Pleau | H04L 63/0884 726/7 |
| 2016/0127356 A1 | 5/2016 | Fukuda et al. | |
| 2017/0318590 A1* | 11/2017 | Byun | H04W 52/244 |

FOREIGN PATENT DOCUMENTS

| | | |
|---|---|---|
| JP | 2013-149238 | 8/2013 |
| JP | 2015-046153 | 3/2015 |
| JP | 2016-091210 | 5/2016 |

\* cited by examiner

FIG.6

| MANAGEMENT NUMBER OF EXTERNAL ACCOUNT | TENANT ID | USER ID | INFORMATION FOR CONNECTING TO SECOND SERVICE PROVIDER 20 | | | ATTRIBUTE | |
| --- | --- | --- | --- | --- | --- | --- | --- |
| | | | USABLE RANGE | access_token | refresh_token | WHETHER SHARED WITHIN TENANT | Delegator |
| id_001 | tenant001 | user001 | email, profile, spreadsheet | access_token_002 | refresh_token_002 | true | app01 |
| id_002 | tenant002 | user002 | email | access_token_002 | refresh_token_002 | false | |

FIG.7

| No. | SHARED WITHIN TENANT | SPECIFICATION |
|---|---|---|
| 1 | false | NOT SPECIFIED (SELECT BY USER) |
| 2 | false | IDENTIFIER OF APPLICATION |
| 3 | false | IDENTIFIER OF CLIENT DEVICE |
| 4 | false | FIXED (SAME FOR ANY APPLICATION, ANY CLIENT DEVICE) |
| 5 | true | NOT SPECIFIED (SELECT BY USER) |
| 6 | true | IDENTIFIER OF APPLICATION |
| 7 | true | IDENTIFIER OF CLIENT DEVICE |
| 8 | true | FIXED (SAME FOR ANY APPLICATION, ANY CLIENT DEVICE) |

INFORMATION PROCESSING SYSTEM, SERVER DEVICE, AND METHOD FOR PROCESSING INFORMATION

CROSS-REFERENCE TO RELATED APPLICATION

The present application claims the benefit of priority under 35 U.S.C. § 119 of Japanese Patent Application No. 2015-167215, filed on Aug. 26, 2015, the contents of which are incorporated herein by reference in their entirety.

BACKGROUND OF THE INVENTION

1. Field of the Invention

The present invention relates to an information processing system, a server device, and a method for processing information.

2. Description of the Related Art

In recent years, cloud service is garnering attention, in which a configuration for providing services by a plurality of service providers (SP) has been implemented.

When using such a service, a user of a client device is required to perform an authentication process with each of the plurality of service providers.

In order to simplify the operations relevant to authentication processes by the user, there is known a method for performing only a single authentication process to complete all of the authentication processes for the user with respect to a plurality of service providers (see, for example, Patent Document 1).

Patent Document 1: Japanese Unexamined Patent Application Publication No. 2013-145505

SUMMARY OF THE INVENTION

An aspect of the present invention provides an information processing system, a server device, and a method for processing information, in which one or more of the above-described disadvantages are reduced.

According to one aspect of the present invention, there is provided an information processing system including a client device; and a server device, wherein the client device includes a first transmitter configured to transmit, to the server device, an acquisition request to acquire information for connecting to an external device that provides at least one external service; and the server device includes a storage configured to store one or more attributes of each of one or more accounts of the at least one external service, and the information for connecting to the external device by using each of the one or more accounts, in association with each other; a receiver configured to receive the acquisition request from the client device; an identifier configured to identify one or more candidate accounts to be used when the client device receives the at least one external service, the one or more candidate accounts being identified based on one or more information elements and the one or more attributes of each of the one or more accounts, the one or more information elements being included in the acquisition request and identifying the one or more accounts of the at least one external service; and a second transmitter configured to transmit, to the client device, the information for connecting to the external device by using the identified one or more candidate accounts.

BRIEF DESCRIPTION OF THE DRAWINGS

Other objects, features and advantages of the present invention will become more apparent from the following detailed description when read in conjunction with the accompanying drawings, in which:

FIG. 6 is a diagram illustrating an example of an external cooperation information table stored in an external cooperation information storage unit according to an embodiment of the present invention;

FIG. 7 is a diagram illustrating an example of filtering patterns stored in the external cooperation information storage unit according to an embodiment of the present invention;

DETAILED DESCRIPTION OF THE PREFERRED EMBODIMENTS

The method of the authentication process of the related art is based on the assumption that the user who has been authenticated will use the account of the user for using the service. In a case where a plurality of users share an account of an external service, the client device of the user is required to perform a user authentication process with a first service provider, subsequently accept a selection of an account of a second service provider, and perform an authentication process for the selected account with respect to the second service provider. The user needs to perform a plurality of authentication processes via the client device and perform a process of selecting an account, and therefore the user needs to perform time consuming procedures until the user can receive the service.

A problem to be solved by an embodiment of the present invention is to provide an information processing system by which a client device of a user can efficiently access a service provider, even when the user is sharing an account with other users.

Embodiments of the present invention will be described by referring to the accompanying drawings.

<System Configuration>

Figure 1:
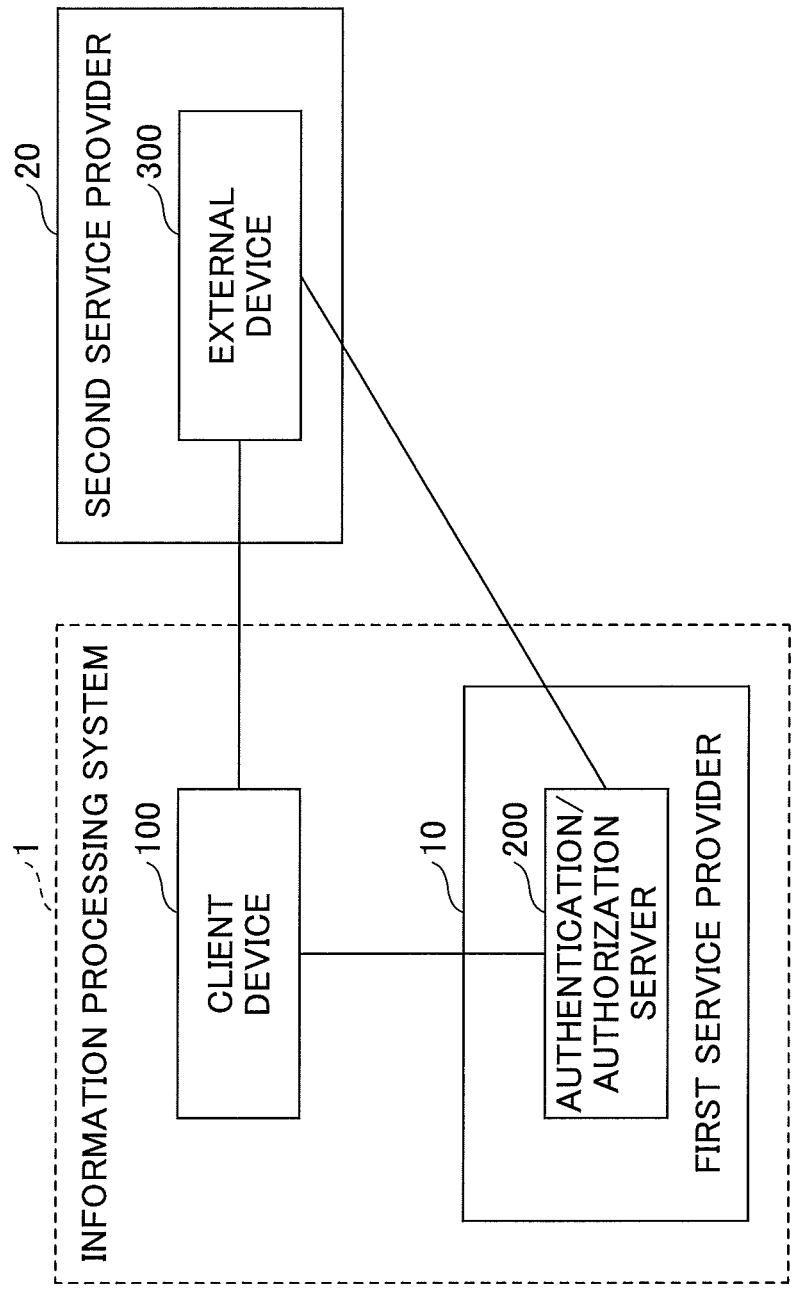
FIG. 1 is a configuration diagram illustrating an example of a system according to an embodiment of the present invention (part 1)
Figure 2:
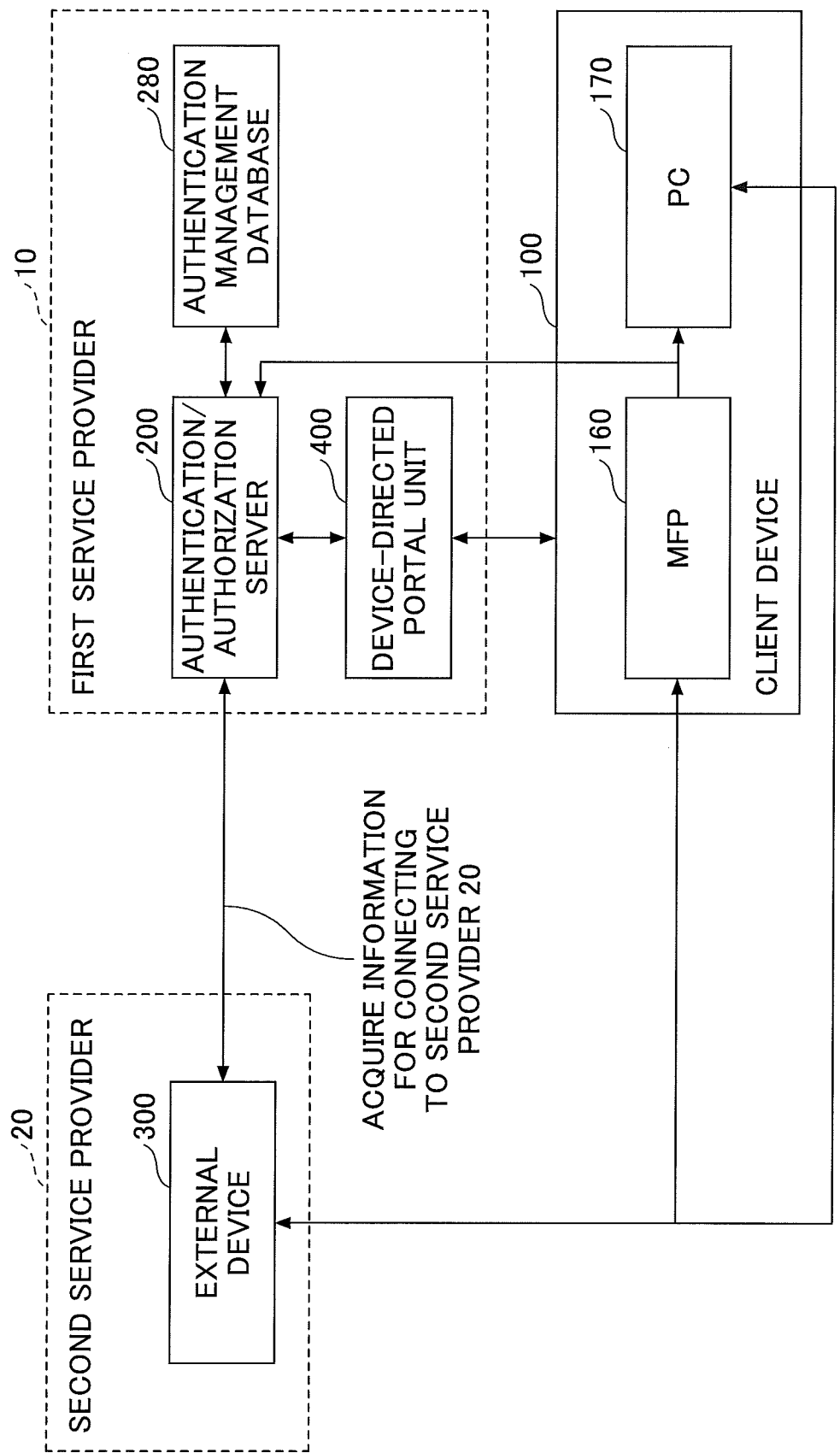
FIG. 2 is a configuration diagram illustrating an example of the system according to an embodiment of the present invention (part 2)

Referring to FIGS. 1 and 2, a description is given of a system configuration according to an embodiment.

FIG. 1 is a configuration diagram illustrating an example of a system according to the present embodiment of the present invention (part 1). An information processing system 1 includes a client device 100 and an authentication/authorization server 200. The authentication/authorization server 200 is disposed in a network of a first service provider 10.

The client device 100 is, for example, a Multifunction Peripheral (MFP) 160 and a Personal Computer (PC) 170 (see FIG. 2).

The first service provider 10 provides various services to a user of the first service provider 10. The type of service to be provided may be set for each tenant, which is an organization to which the user belongs. The first service provider 10 provides a service independently or provides a service by cooperating with another service provider (for example, a second service provider 20).

The client device 100 and the authentication/authorization server 200 are connected via a network.

The client device 100 sends a request to the authentication/authorization server 200 to acquire information required for connecting to the second service provider 20. Here, the information required for the connection is authentication information, etc., which is used when connecting to the second service provider 20.

The authentication/authorization server 200 stores identifiers of accounts of the second service provider 20, the attributes of the respective accounts, and information for connecting to the second service provider 20 by using the respective accounts, in association with each other.

The authentication/authorization server 200 authenticates the user of the client device 100. The authentication is performed based on authentication information for the first service provider 10.

The authentication/authorization server 200 identifies a candidate account of the second service provider 20, based on information elements included in the acquisition request and the attributes of the respective accounts. The information elements and the attributes are, for example, a tenant ID that is an identifier indicating a tenant to which the user belongs, an identifier (application ID) of an application used at the second service provider 20, and an identifier (client device ID) of the client device 100. Note that a candidate account is identified from accounts belonging to the same tenant as the user of the client device 100.

The client device ID is an identifier such as a Media Access Control (MAC) address for uniquely identifying the client device 100. The client device ID may be an identifier other than a MAC address, as long as the client device 100 can be uniquely identified. The application ID is an identifier of the application or an identifier for uniquely identifying an installed application (for example, a product ID of the application). Details of the method of identifying a candidate account are described below.

The authentication/authorization server 200 sends information for connecting to the second service provider 20 by using a candidate account, to the client device 100.

The client device 100 selects an account from the candidate accounts received from the authentication/authorization server 200. When only one candidate account is reported, the client device 100 uses the reported candidate account as the account used when connecting to the second service provider 20.

When a plurality of candidate accounts are reported, the client device 100 selects one account from the plurality of candidate accounts. The selection may be executed based on an instruction from the user of the client device 100.

The client device 100 uses the information for connecting to the second service provider 20 corresponding to the selected account of the second service provider 20, to connect to the second service provider 20. Specifically, the client device 100 connects to an external device 300 disposed in the network of the second service provider 20. The external device 300 provides various services provided by the second service provider 20, to the client device 100.

Accordingly, the client device 100 is able to connect to the external device 300 and receive the service by using the selected account, without performing an authentication process at the second service provider 20.

Next, referring to FIG. 2, a more detailed description is given of the configuration of the system according to the present embodiment.

FIG. 2 is a configuration diagram illustrating an example of the system according to the present embodiment of the present invention (part 2).

The authentication/authorization server 200 acquires information for connecting to the second service provider 20, from the external device 300 of the second service provider 20.

A database 280 (authentication management DB) stores various kinds of information used at the first service provider 10 and information for connecting to the second service provider 20, etc. In response to an instruction from the authentication/authorization server 200, the database 280 identifies information required for executing a process by the authentication/authorization server 200, and reports the identified information to the authentication/authorization server 200. The database 280 may be disposed in the authentication/authorization server 200.

The MFP 160 and the PC 170 acquire information for connecting to the second service provider 20, from the authentication/authorization server 200.

The MFP 160 may connect to the authentication/authorization server 200 via a device-directed portal unit 400. The device-directed portal unit 400 includes functions for making various settings such as device registration of the MFP 160.

The client device 100 may acquire information for connecting to the second service provider 20 from the external device 300 and report the information for connection to the authentication/authorization server 200.

<Hardware Configuration>

Figure 3:
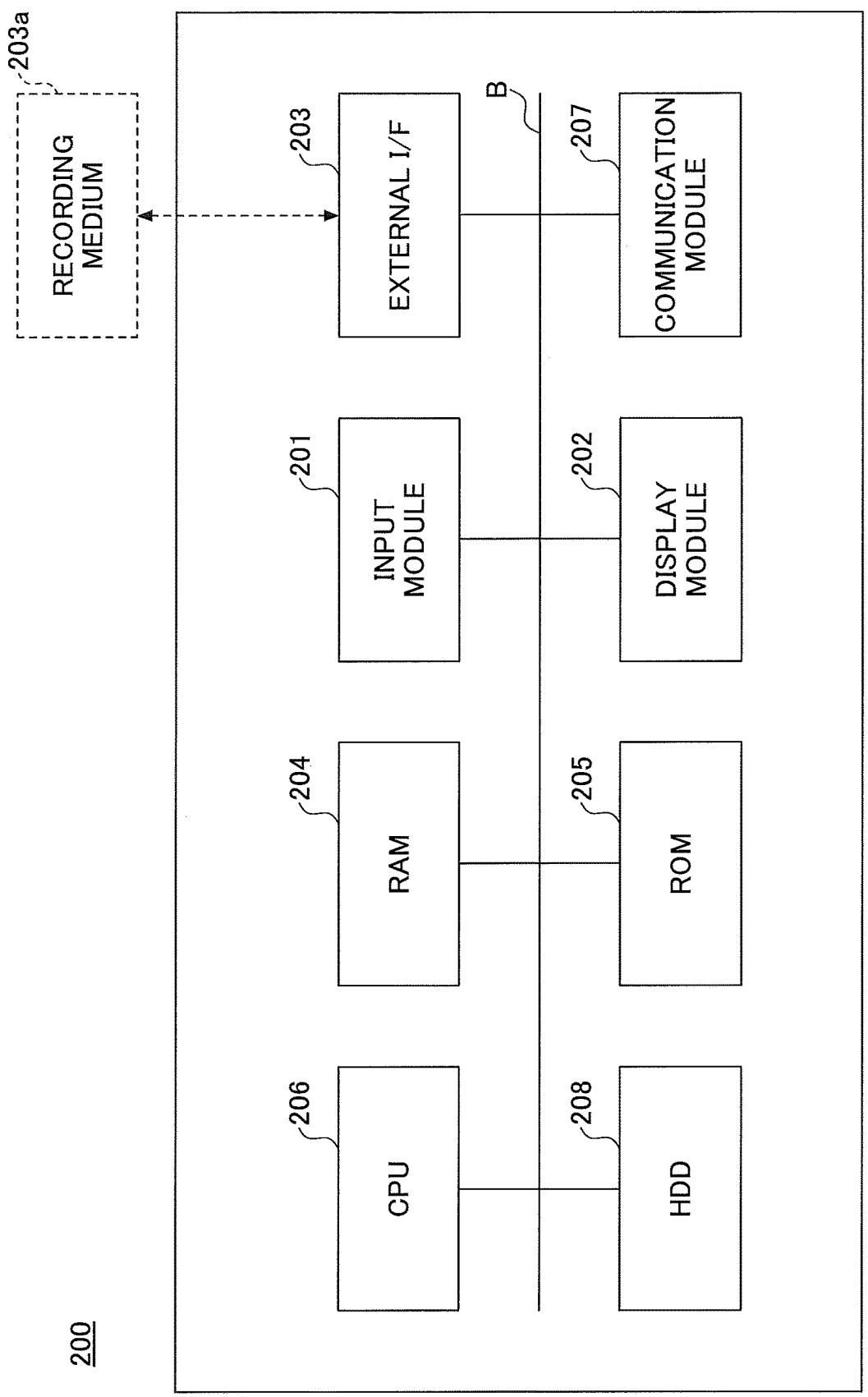
FIG. 3 is a block diagram illustrating an example of a hardware configuration of an authentication/authorization server according to an embodiment of the present invention.

FIG. 3 is a block diagram illustrating an example of a hardware configuration of the authentication/authorization server 200 according to the present embodiment of the present invention.

The authentication/authorization server 200 includes an input module 201, a display module 202, an external interface (I/F) 203, a Random Access Memory (RAM) 204, a Read-Only Memory (ROM) 205, a Central Processing Unit (CPU) 206, a communication module 207, and a Hard Disk Drive (HDD) 208, etc., which are interconnected by a bus B.

The input module 201 includes a keyboard, a mouse, and a touch panel, etc., and is used by the user for inputting various operation signals.

The display module 202 includes a display, etc., and displays processing results obtained by the authentication/authorization server 200.

The communication module 207 connects the authentication/authorization server 200 to a network. The authentication/authorization server 200 performs transmission and reception of data via the communication module 207.

The HDD 208 is a non-volatile storage device storing programs and data. The stored programs and data are, for example, an Operating System (OS) that is basic software controlling the entire authentication/authorization server 200 and application software providing various functions on the OS, etc.

The HDD 208 manages the stored programs and data by a predetermined file system and/or a database (DB).

The external I/F 203 is an interface between the authentication/authorization server 200 and an external device. An example of an external device is a recording medium 203a. Accordingly, the authentication/authorization server 200 is able to read and/or write information in the recording medium 203a via the external I/F 203.

Examples of the recording medium 203a are a flexible disk, a Compact Disk (CD), a Digital Versatile Disk (DVD), a Secure Digital (SD) memory card, and a Universal Serial Bus (USB) memory, etc., The ROM 205 is a non-volatile semiconductor memory (storage device) that can store programs and data even after the power is turned off. The ROM 205 stores programs and data such as a Basic Input/Output System (BIOS) that is executed when the authentication/authorization server 200 is activated, OS settings, and network settings, etc.

The RAM 204 is a volatile semiconductor memory (storage device) for temporarily storing programs and data.

The CPU 206 is an arithmetic device for controlling the entire authentication/authorization server 200 and realizing functions of the authentication/authorization server 200 and realizing functions of the authentication/authorization server 200, by loading the programs and data from the storage devices such as the ROM 205 and the HDD 208, into the RAM 204, and executing processes.

The client device 100 can also be realized by the same hardware configuration as the hardware configuration of the authentication/authorization server 200.

The authentication/authorization server 200 and the client device 100 are able to realize various processes described below, by having the CPU 206 execute programs stored in the ROM 205, etc.

Note that when the client device 100 is the MFP 160, hardware devices exclusively used for realizing functions such as a printing function, a fax function, and a scanner function, etc., provided by the MFP 160, may be added to the hardware configuration.

<Functional Configuration>
(1) Authentication/Authorization Server

Figure 4:
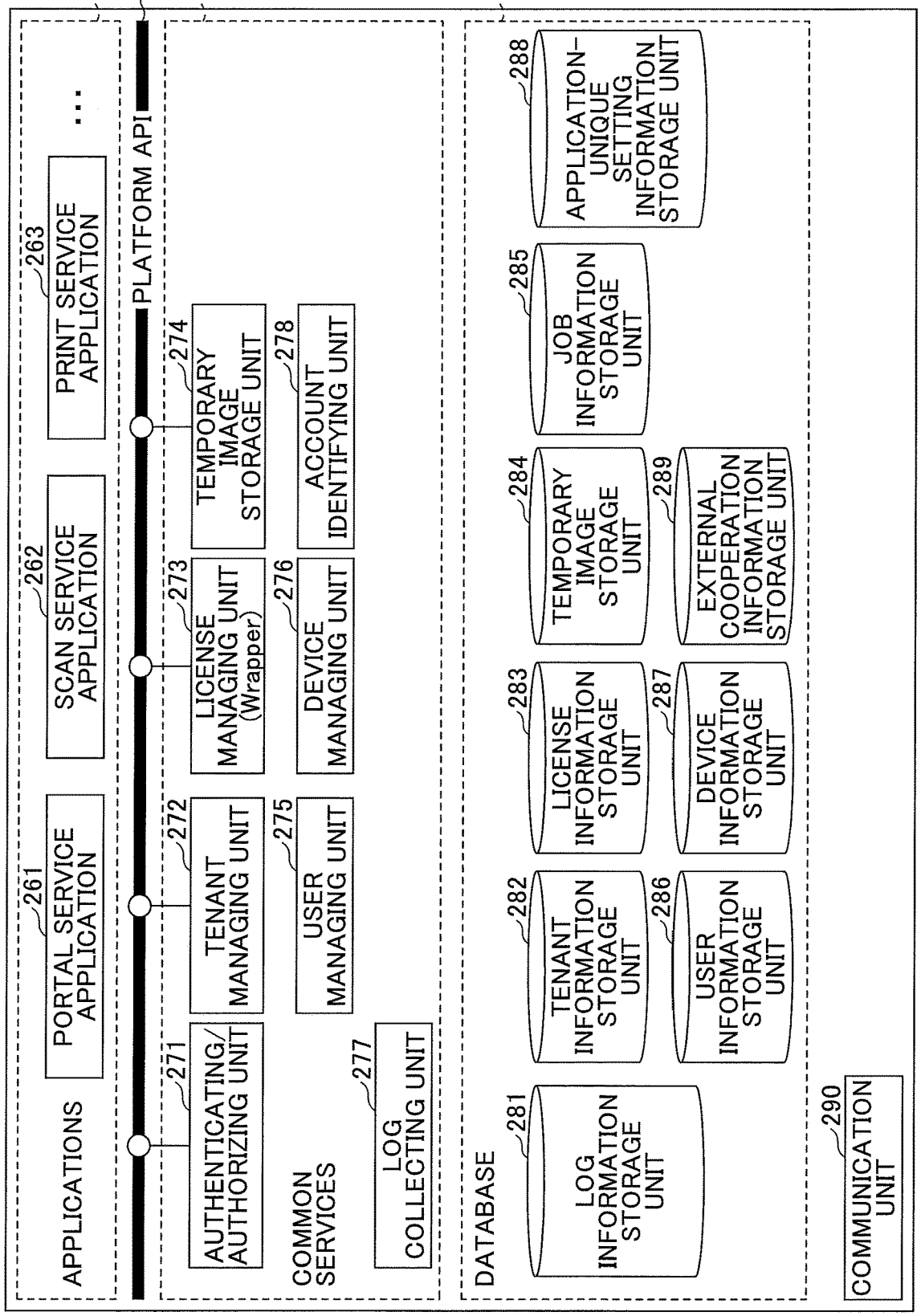
FIG. 4 is a block diagram illustrating an example of a functional configuration of the authentication/authorization server according to an embodiment of the present invention.

FIG. 4 is a block diagram illustrating an example of a functional configuration of the authentication/authorization server 200 according to the present embodiment of the present invention.

The authentication/authorization server 200 realizes applications 260, common services 270, the database (DB) 280, and a platform Application Programming Interface (API) 264, etc.

The applications 260 include, for example, a portal service application 261, a scan service application 262, and a print service application 263.

The portal service application 261 is an application for providing a portal service. The portal service application 261 provides a service of an entrance for using the authentication/authorization server 200.

The scan service application 262 is an application for providing a scan service. The print service application 263 is an application for providing a print service. The applications 260 may include other service applications.

The platform API 264 is an interface for the applications 260, such as the portal service application 261, the scan service application 262, and the print service application 263, to use the common services 270.

The platform API 264 is an interface that is defined in advance. The platform API 264 is provided for the common services 270 to receive requests from the applications 260. For example, the platform API 264 is formed of functions and classes, etc.

When the authentication/authorization server 200 is formed of a plurality of information processing apparatuses, the platform API 264 may be realized by, for example, a Web API that can be used via the network.

The common services 270 include an authenticating/authorizing unit 271, a tenant managing unit 272, a user managing unit 275, a license managing unit (Wrapper) 273, a device managing unit 276, a temporary image storage unit 274, a log collecting unit 277, and an account identifying unit 278.

The authenticating/authorizing unit 271 executes authentication/authorization based on a request for a service from the client device 100.

The authenticating/authorizing unit 271 accesses, for example, a user information storage unit 286 and a license information storage unit 283, and authenticates/authorizes a user.

Furthermore, for example, the authenticating/authorizing unit 271 authenticates the client device 100 by cooperating with a tenant information storage unit 282, the license information storage unit 283, and a device information storage unit 287.

The tenant managing unit 272 manages tenant information stored in the tenant information storage unit 282. The user managing unit 275 manages user information stored in the user information storage unit 286.

The license managing unit 273 manages license information stored in the license information storage unit 283. The device managing unit 276 manages device information stored in the device information storage unit 287. The temporary image storage unit 274 stores a temporary image in a temporary image storage unit 284, and acquires a temporary image from the temporary image storage unit 284.

The log collecting unit 277 collects login information of a user and stores the login information in a log information storage unit 281.

The account identifying unit 278 identifies a candidate account to be used when the client device 100 receives a service from the second service provider 20. The account identifying unit 278 identifies a candidate account based on information elements and attributes of accounts of the second service provider 20. The information elements identify accounts of an external service, and the information elements are included in a request to acquire information for connecting to the second service provider 20 received from the client device 100. Note that the attributes of accounts of the second service provider 20 are stored in an external cooperation information storage unit 289.

When the user authentication of the user by the authenticating/authorizing unit 271 is successful, the account identifying unit 278 may identify a candidate account.

The database 280 includes the log information storage unit 281, the tenant information storage unit 282, the user information storage unit 286, the license information storage unit 283, the device information storage unit 287, the temporary image storage unit 284, a job information storage unit 285, an application-unique setting information storage unit 288, and the external cooperation information storage unit 289.

The log information storage unit 281 stores log information. The tenant information storage unit 282 stores tenant information. The user information storage unit 286 stores user information. The license information storage unit 283 stores license information. The device information storage unit 287 stores device information.

The external cooperation information storage unit 289 stores information required for cooperating with an external service provider such as the second service provider 20, etc. The external cooperation information storage unit 289 stores filtering patterns and an external cooperation information table described below.

The external cooperation information storage unit 289 stores identifiers of accounts of the second service provider 20, attributes of the respective accounts, and information for connecting to the external device 300 by using the respective accounts, in association with each other.

The temporary image storage unit 284 stores a temporary image. A temporary image is, for example, a file or data such as a scan image. The job information storage unit 285 stores information (job information) of a request relevant to a process (job). The application-unique setting information storage unit 288 stores setting information unique to the application 260.

In addition to the above, the authentication/authorization server 200 includes a communication unit 290 for performing transmission and reception of data with the client device 100 and the external device 300.

The communication unit 290 receives a request to acquire information for connecting to the second service provider 20 from the client device 100, and reports the acquisition request to the account identifying unit 278. Furthermore, the communication unit 290 sends information for connecting to the second service provider 20 by using a candidate account identified by the account identifying unit 278, to the client device 100.

The authentication/authorization server 200 functions as an integration basis for providing common services relevant to authentication/authorization and image processing, and a group of services for providing application services such as a scan service, a print service, and a portal service by using the function of the integration basis.

The integration basis includes, for example, the common services 270, the database 280, and the platform API 264. The group of services includes, for example, the applications 260.

The authentication/authorization server 200 illustrated in FIG. 4 has a configuration in which the group of services and the integration basis are separated. Therefore, the first service provider 10 can easily develop the applications 260 using the platform API 264.

Note that the classification form of the process blocks of the authentication/authorization server 200 illustrated in FIG. 4 is one example. The applications 260, the common services 270, and the database 280 need not be classified into the hierarchies as illustrated in FIG. 4. As long as processes by the authentication/authorization server 200 according to the present embodiment can be performed, the hierarchical relationship, etc., illustrated in FIG. 4 is not limited to a particular relationship.

(2) Client Device

Figure 5:
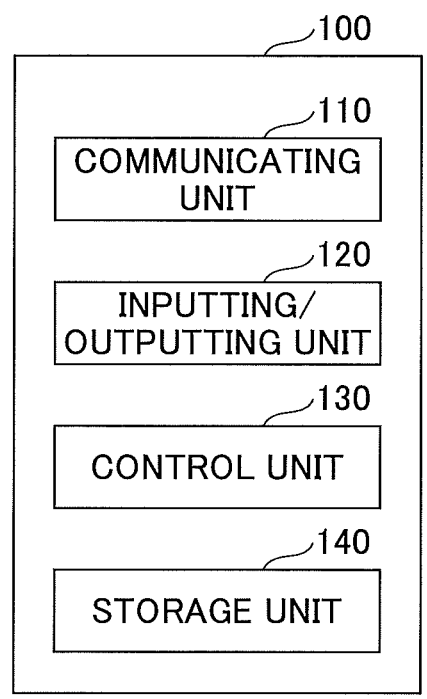
FIG. 5 is a block diagram illustrating an example of a functional configuration of a client device according to an embodiment of the present invention.

FIG. 5 is a block diagram illustrating an example of a functional configuration of the client device 100 according to the present embodiment of the present invention.

The client device 100 includes a communicating unit 110, an inputting/outputting unit 120, a control unit 130, and a storage unit 140.

The communicating unit 110 performs transmission and reception of data with the authentication/authorization server 200 and the external device 300.

The communicating unit 110 receives an instruction from the control unit 130, and sends a request to acquire information for connecting to the second service provider 20, to the authentication/authorization server 200.

The communicating unit 110 receives information for connecting to the second service provider 20 by using a candidate account of the second service provider 20 that has been identified by the authentication/authorization server 200, from the authentication/authorization server 200.

Furthermore, the communicating unit 110 receives an instruction from the control unit 130, and uses the information for connecting to the second service provider 20 received from the authentication/authorization server 200, to connect to the external device 300.

The inputting/outputting unit 120 displays various kinds of information to the user of the client device 100, and also accepts input from the user. The inputting/outputting unit 120 may display information of candidate accounts received from the authentication/authorization server 200, and accept a selection of an account by the user of the client device 100.

The control unit 130 implements various kinds of control with respect to the functions of the client device 100.

The storage unit 140 stores various kinds of information received from the authentication/authorization server 200. The storage unit 140 stores information of the account selected by the user of the client device 100.

<Information Stored in External Cooperation Information Storage Unit>

FIG. 6 is a diagram illustrating an example of an external cooperation information table stored in the external cooperation information storage unit 289 according to the present embodiment of the present invention.

In the external cooperation information table, a user ID that is an identifier of an account, a tenant ID expressing the tenant to which the user belongs, information for connecting to the second service provider 20, and attributes are stored for each account. The user ID is the ID of the account of the second service provider 20. Note that a user ID common to the first service provider 10 and the second service provider 20 may be used.

The information for connecting to the second service provider 20 is, for example, the usable range, access_token, and refresh_token, etc.

The usable range expresses the range that can be used by each account. In the example of FIG. 6, as the usable range of the account having a management number "id_001", email, profile, and spreadsheet are set. In this case, the client device 100 can use this account to receive services relevant to e-mails, setting and changing the profile of the account, and spreadsheets, from the second service provider 20.

Access_token is information indicating that the account has logged into the second service provider 20. When the client device 100 sends a request for connection including access_token to the external device 300, the client device 100 is able to receive a service from the external device 300, without performing an authentication process with the external device 300.

Refresh_token is information indicating the validity period of access_token.

As the attributes, for example, "whether shared within tenant" and Delegator are set.

As "whether shared within tenant", true or false is set. When true is set in the field of whether shared within tenant, the corresponding account can be shared among users belonging to the same tenant. When false is set in the field of whether shared within tenant, the corresponding account cannot be shared among users belonging to the same tenant.

In the field of Delegator, an application ID (of example, app01) or a client device ID is set.

In the field of Delegator, an identifier, which indicates that the account is a common account shared in the tenant to which the user belongs, may be set. This identifier may be, for example, true.

FIG. 7 is a diagram illustrating an example of filtering patterns stored in the external cooperation information storage unit 289 according to the present embodiment of the present invention.

FIG. 7 indicates eight filtering patterns. The filtering patterns may be set in units of tenants.

The account identifying unit 278 uses a filtering pattern that has been set, to identify a candidate account from among the accounts having the same tenant ID as the tenant ID of the user of the client device 100.

The filtering pattern includes the fields of "whether shared within tenant" and specification.

As "whether shared within tenant" in the filtering pattern, true or false is set. True indicates that an account, for which "whether shared within tenant" is set as "shared", is extracted by the account identifying unit 278. False indicates that an account, for which "whether shared within tenant" is set as "not shared", is extracted by the account identifying unit 278.

When true is set in the filtering pattern, that is, when the filtering patterns of numbers 5 through 8 are set, the account identifying unit 278 first extracts the accounts having true set for "whether shared within tenant" in the external cooperation information table.

On the other hand, when false is set in the filtering pattern, that is, when the filtering patterns of numbers 1 through 4 are set, the account identifying unit 278 first extracts the accounts having false set for "whether shared within tenant" in the external cooperation information table.

Next, the account identifying unit 278 identifies the candidate accounts to be reported to the client device 100, from among the accounts extracted by using the field of specification in the filtering patterns.

When the filtering pattern of no. 1 or no. 5 is set, the account identifying unit 278 identifies, as a candidate account, an account for which "shared" is set for "whether shared within tenant" or an account for which "not shared" is set for "whether shared within tenant", among the accounts having the same tenant ID as the tenant ID of the user of the client device 100.

In this case, there is a high possibility that a plurality of candidate accounts are identified. Therefore, the client device 100 may display the candidate accounts received from the authentication/authorization server 200, and accept a selection of an account by the user of the client device 100.

When the filtering pattern of no. 2 or no. 6 is set, the account identifying unit 278 identifies, as a candidate account, an account for which the application ID included in the information elements of the acquisition request received from the client device 100 matches the application ID set in the field of Delegator in the external cooperation information table.

When the filtering pattern of no. 3 or no. 7 is set, the account identifying unit 278 identifies, as a candidate account, an account for which the client device ID included in the information elements of the acquisition request received from the client device 100 matches the client device ID set in the field of Delegator in the external cooperation information table.

When the filtering pattern of no. 4 or no. 8 is set, the account identifying unit 278 identifies, as a candidate account, an account for which an identifier (for example, true), which indicates that the account is a common account shared in the tenant to which the user belongs, is set in the field of Delegator in the external cooperation information table.

When accounts for which "shared" is set as "whether shared within tenant" are extracted, only the accounts of users who are allowing a setting of being shared within tenant become candidate accounts, and therefore the account will be shared with other users. Accordingly, an advantage is achieved in that the accounts of users who are not allowing a setting of being shared within tenant, are unaffected.

When "not specified" is set the field of specification, an advantage is achieved in that the user of the client device 100 is able to select an account from among the candidate accounts.

When "application ID" or "client device ID" is set the field of specification, a candidate account can be identified according to the application to be used or the client device 100.

Furthermore, in this case, the user of the client device 100 will not be able to operate the account from another application or another client device, and therefore an advantage is achieved in that erroneous deletions or erroneous updating of the information in the account can be avoided.

When "fixed" is set the field of specification, a common account in the tenant of the user is identified, and therefore an advantage is achieved in that the administrator can easily manage the account.

Note that when the filtering pattern of no. 1 is set, all of the accounts for which "not shared" is set for "whether shared within tenant" are the candidate accounts. Therefore, the client device 100 may accept a selection of all of the accounts from the user. Considering the possibility of erroneous selections by the user, it is not preferable that all of the accounts for which "not shared" is set for "whether shared within tenant" are reported as candidate accounts. Thus, filtering patterns other than the filtering pattern of no. 1 are preferably set.

<Operation Procedures>

(1) Registration of Information for Connecting to Second Service Provider

Figure 8:
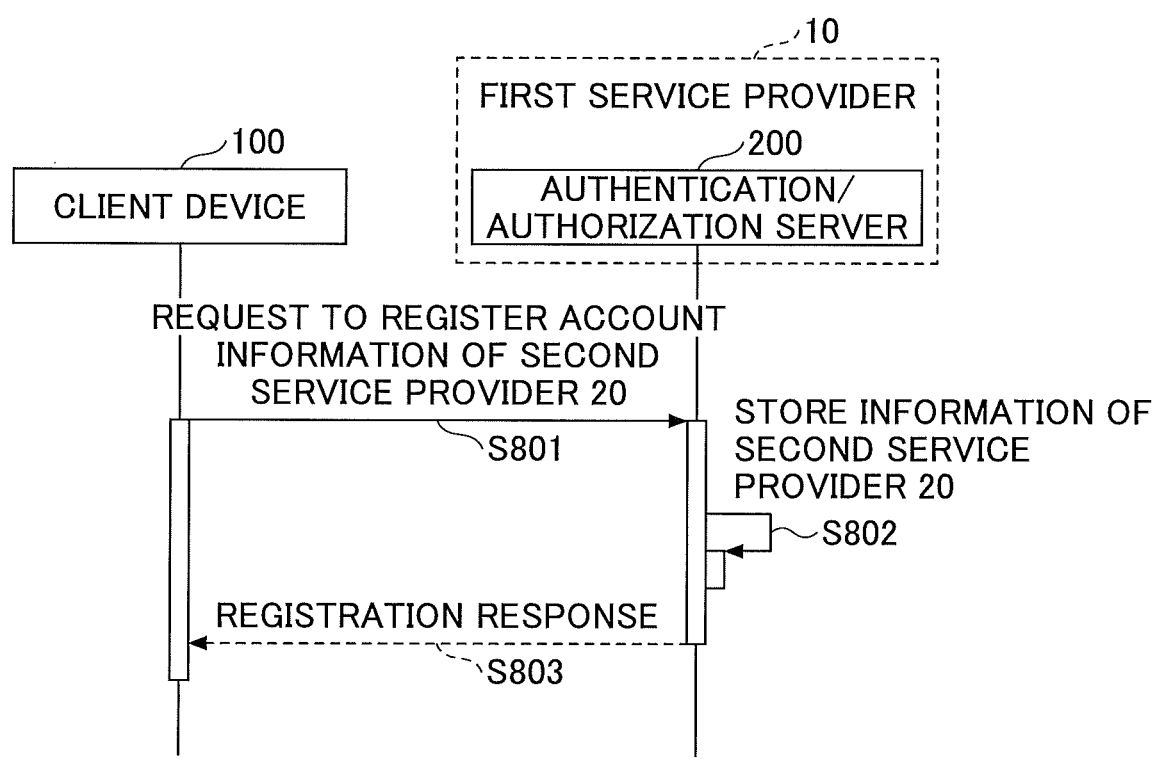
FIG. 8 is a sequence diagram illustrating an example of operation procedures of registering information for connecting to a second service provider according to an embodiment of the present invention.

FIG. 8 is a sequence diagram illustrating an example of operation procedures of registering information for connecting to the second service provider 20 according to the present embodiment of the present invention.

The authentication/authorization server 200 may directly acquire the information for connecting to the second service provider 20 from the external device 300, or the client device 100 may acquire the information from the external device 300 and forward the information to the authentication/authorization server 200.

The client device 100 acquires the information of the accounts of the second service provider 20 from the external device 300. Specifically, the information of the accounts includes the usable range, access_token, and refresh_token. Subsequently, the client device 100 performs the operation of step S801.

In step S801, the communicating unit 110 of the client device 100 sends a request to register information of accounts of the second service provider 20, to the authentication/authorization server 200. The registration request includes a user ID, a tenant ID, and information of the accounts of the second service provider 20. Note that the registration request may include attributes of the accounts.

In step S802, the communication unit 290 of the authentication/authorization server 200 receives the registration request, and the external cooperation information storage unit 289 stores the received information of the second service provider 20. When the registration request includes attributes, the external cooperation information storage unit 289 also stores the attributes.

In step S803, the communication unit 290 of the authentication/authorization server 200 sends a response indicating that the information of accounts of the second service provider 20, etc., has been registered, to the client device 100.

(2) Acquisition of Information of Candidate Accounts (Part 1)

Figure 9:
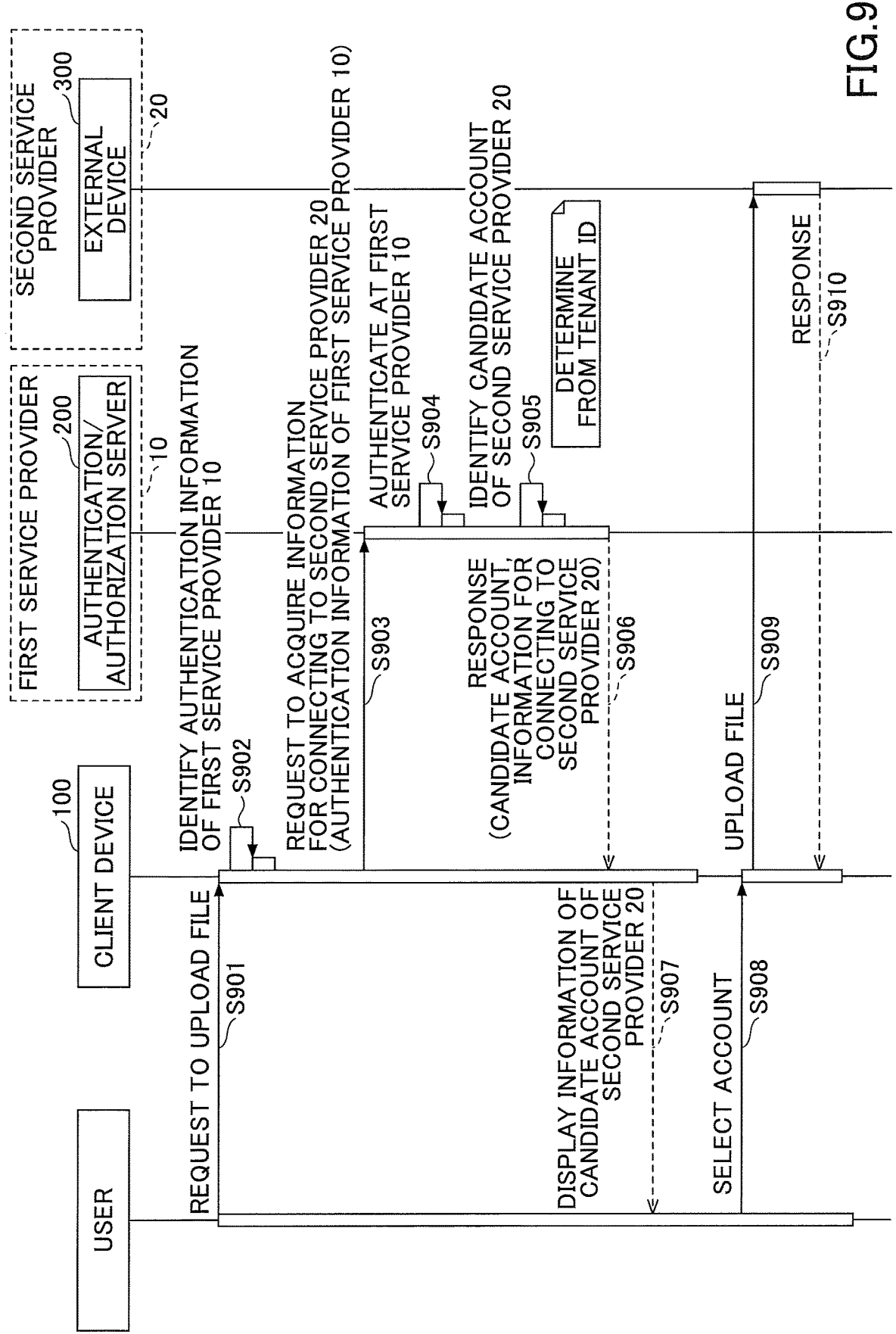
FIG. 9 is a sequence diagram illustrating an example of operation procedures of acquiring information of candidate accounts according to an embodiment of the present invention (part 1)

FIG. 9 is a sequence diagram illustrating an example of operation procedures of acquiring information of candidate accounts according to the present embodiment of the present invention (part 1).

Referring to FIG. 9, a description is given of operation procedures in a case where the user is using a storage service of files provided by the second service provider 20.

In step S901, the inputting/outputting unit 120 of the client device 100 accepts a request to upload a file from a user.

In step S902, the control unit 130 of the client device 100 refers to the storage unit 140, and identifies information required for an authentication process at the first service provider 10 (hereinafter, "authentication information"). When the client device 100 has already connected to the authentication/authorization server 200 and the authentication process has been successful, the authentication information is stored in the storage unit 140. When the authentication information is not stored, the inputting/outputting unit 120 of the client device 100 may accept input of information required for authentication from the user of the client device 100, such as a tenant ID, a user ID, and a password, etc.

In step S903, the communicating unit 110 of the client device 100 sends a request to acquire information for connecting to the second service provider 20, to the authentication/authorization server 200. The acquisition request includes authentication information for the first service provider 10.

In step S904, the authenticating/authorizing unit 271 of the authentication/authorization server 200 uses the received authentication information for the first service provider 10 to perform an authentication process at the first service provider 10.

In step S905, the account identifying unit 278 of the authentication/authorization server 200 identifies candidate accounts of the second service provider 20. The account identifying unit 278 confirms that the filtering pattern stored in the external cooperation information storage unit 289 is the filtering pattern of no. 5 ("whether shared within tenant": true, specification: not specified). The account identifying unit 278 refers to the external cooperation information table, and identifies the accounts for which true is set for "whether shared within tenant", among the accounts having the same tenant ID as the tenant ID of the user of the client device 100 from which the acquisition request has been received.

In step S906, the communication unit 290 of the authentication/authorization server 200 sends a response, which includes identifiers of candidate accounts and information for connecting to the second service provider 20 by using the candidate accounts, to the client device 100.

In step S907, the inputting/outputting unit 120 of the client device 100 displays the received information of the candidate accounts of the second service provider 20.

In step S908, the inputting/outputting unit 120 of the client device 100 accepts a selection of an account from the user.

In step S909, the communicating unit 110 of the client device 100 connects to the external device 300, and uploads a file. When connecting to the external device 300, the communicating unit 110 sends signals including "information for connecting to the second service provider 20" of the account selected by the user.

In step S910, the communicating unit 110 of the client device 100 receives a response indicating that the uploading of the file has been completed, from the external device 300.

Figure 10:
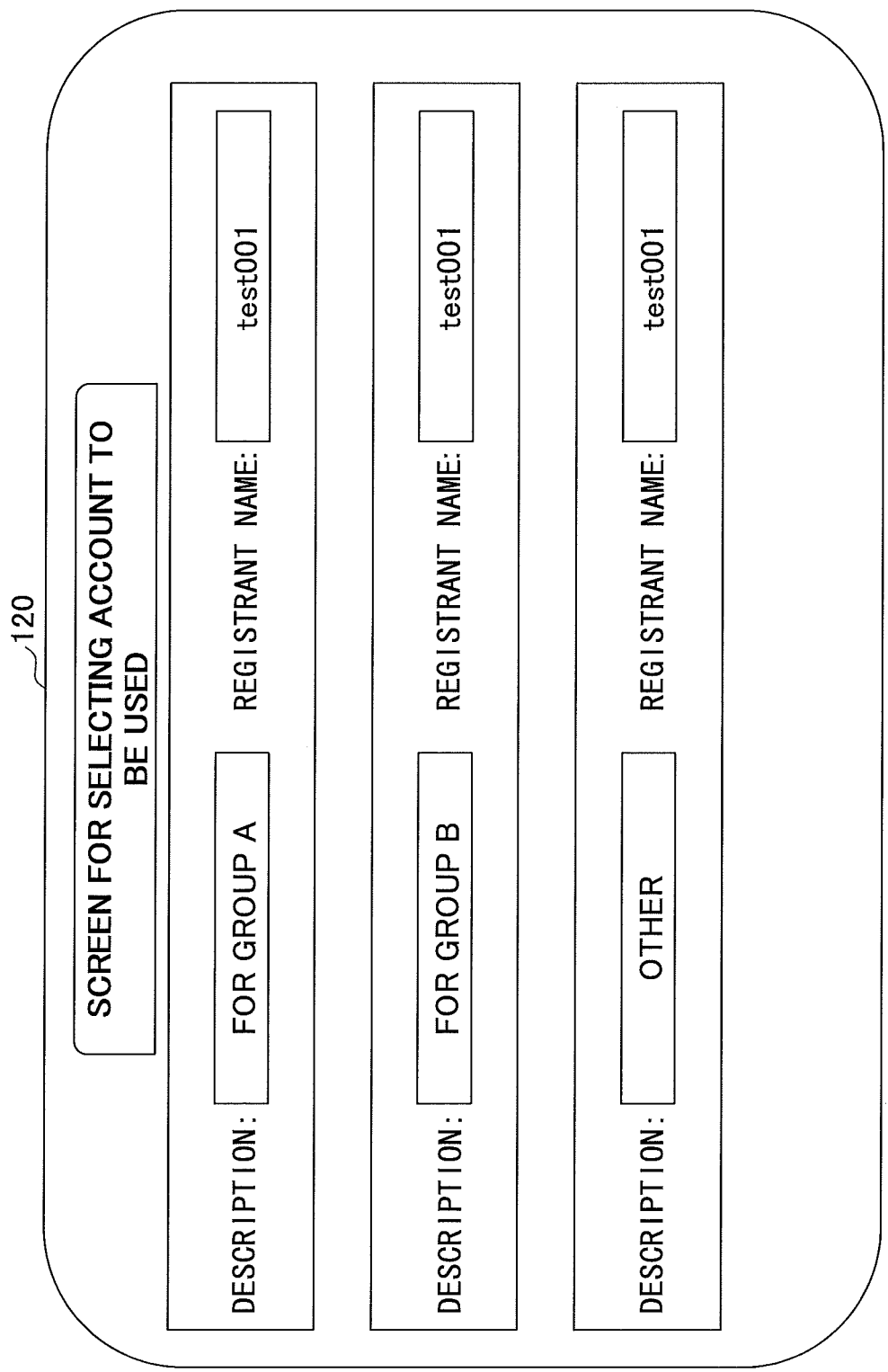
FIG. 10 is a diagram illustrating an example of a screen displayed on an inputting/outputting unit according to an embodiment of the present invention.

FIG. 10 is a diagram illustrating an example of a screen displayed on the inputting/outputting unit 120 according to the present embodiment of the present invention.

In step S907, the inputting/outputting unit 120 of the client device 100 may display the screen of FIG. 10 and prompt the user of the client device 100 to select an account.

(3) Acquisition of Information of Candidate Accounts (Part 2)

Figure 11:
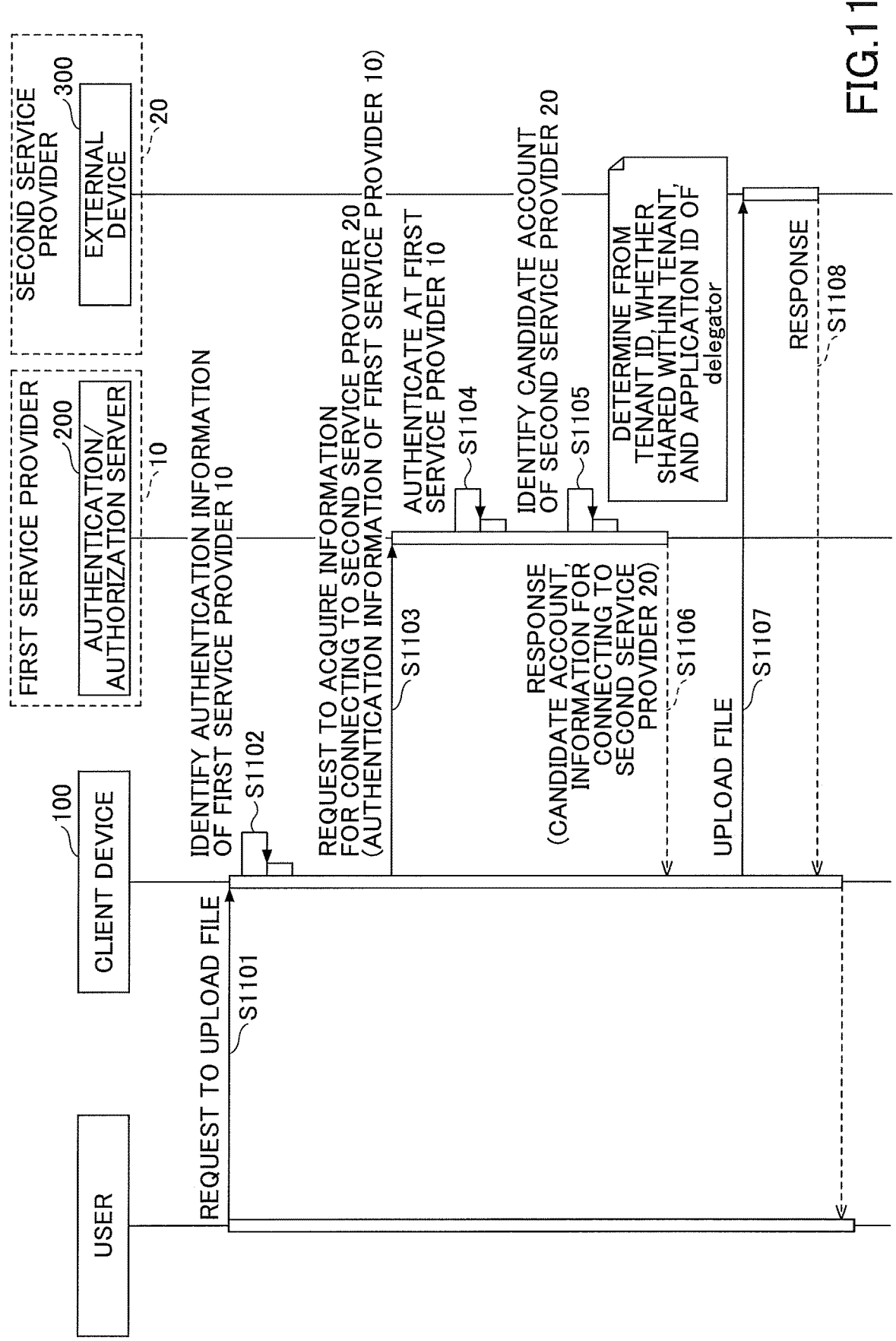
FIG. 11 is a sequence diagram illustrating an example of operation procedures of acquiring information of candidate accounts according to an embodiment of the present invention (part 2)

FIG. 11 is a sequence diagram illustrating an example of operation procedures of acquiring information of candidate accounts according to the present embodiment of the present invention (part 2). Descriptions with respect to the same procedures as the operation procedures of FIG. 9 are omitted, and only the different parts are described.

The procedures of steps S1101 and S1102 are the same as steps S901 and S902, and therefore descriptions of these steps are omitted.

In step S1103, the communicating unit 110 of the client device 100 sends a request to acquire information for connecting to the second service provider 20, to the authentication/authorization server 200. The acquisition request includes authentication information for the first service provider 10. Furthermore, information elements of the acquisition request include an application ID.

The procedure of step S1104 is the same as step S904, and therefore descriptions of this step is omitted.

In step S1105, the account identifying unit 278 of the authentication/authorization server 200 identifies candidate accounts of the second service provider 20. The account identifying unit 278 confirms that the filtering pattern stored in the external cooperation information storage unit 289 is the filtering pattern of no. 6 ("whether shared within tenant": true, specification: identifier of application).

The account identifying unit 278 refers to the external cooperation information table, and extracts the accounts for which true is set for "whether shared within tenant", among the accounts having the same tenant ID as the tenant ID of the user of the client device 100 from which the acquisition request has been received. The account identifying unit 278 identifies the account for which the application ID set in Delegator of the attributes matches the application ID included in the received information elements, among the extracted accounts.

Step S1106 is the same as step S906. However, in the case of step S1106, the response includes the identifier of one candidate account having a matching application ID and information for connecting to the second service provider 20 by using this candidate account.

In the operation procedures of FIG. 11, only one candidate account is received, and therefore the inputting/outputting unit 120 of the client device 100 does not display a screen for prompting the user of the client device 100 to select an account.

The procedures of steps S1107 and S1108 are the same as steps S909 and S910, and therefore descriptions of these steps are omitted.

(4) Acquisition of Information of Candidate Accounts (Part 3)

Figure 12:
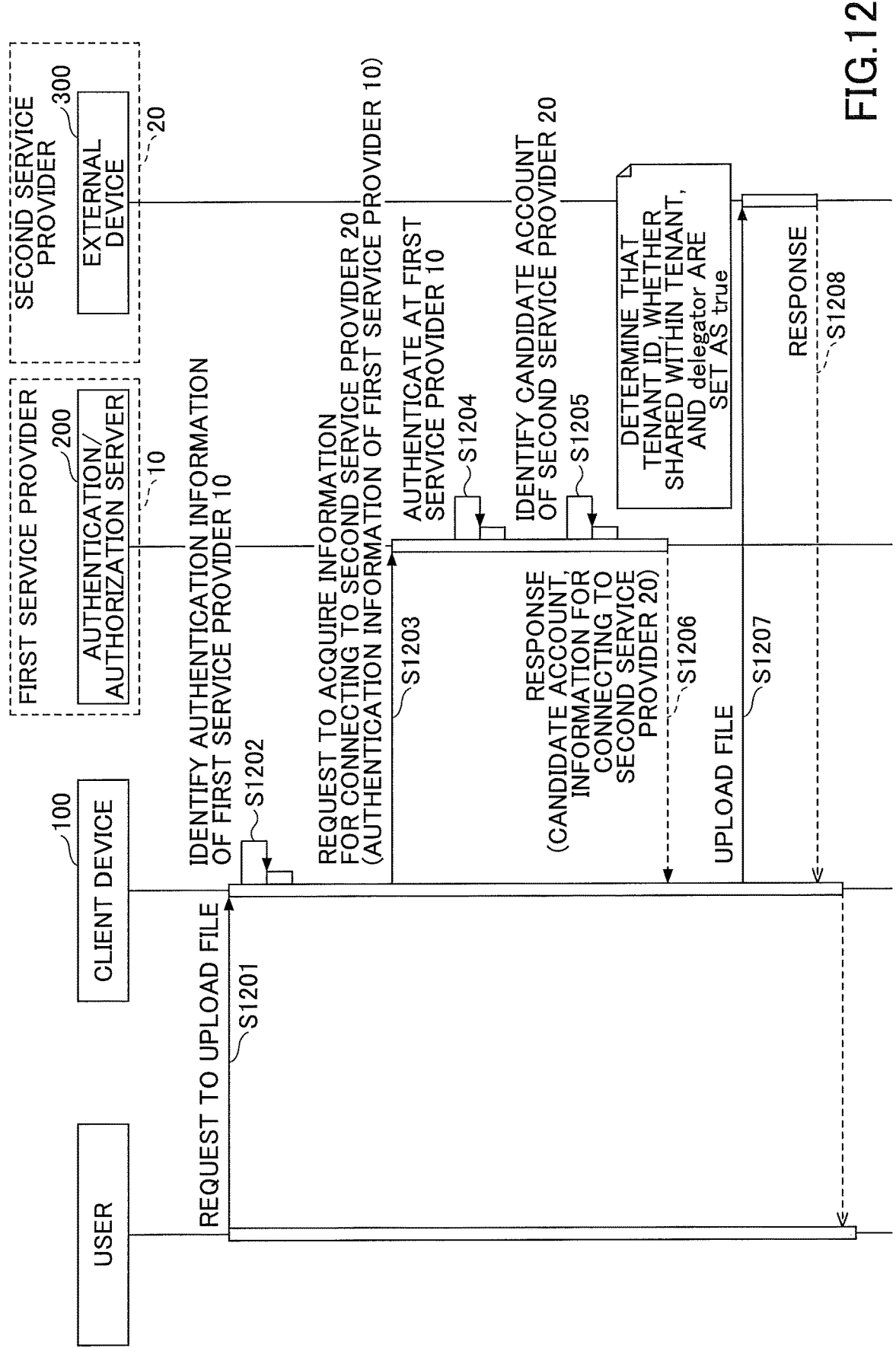
FIG. 12 is a sequence diagram illustrating an example of operation procedures of acquiring information of candidate accounts according to an embodiment of the present invention (part 3)

FIG. 12 is a sequence diagram illustrating an example of operation procedures of acquiring information of candidate accounts according to the present embodiment of the present invention (part 3).

The procedures of steps S1201 through S1204 are the same as steps S1101 through S1104, and therefore descriptions of these steps are omitted. Note that the request to acquire information for connecting to the second service provider 20 in step S1203 does not have to include an application ID.

In step S1205, the account identifying unit 278 of the authentication/authorization server 200 identifies candidate accounts of the second service provider 20. The account identifying unit 278 confirms that the filtering pattern stored in the external cooperation information storage unit 289 is the filtering pattern of no. 8 ("whether shared within tenant": true, specification: fixed).

The account identifying unit 278 refers to the external cooperation information table, and extracts the accounts for which true is set for "whether shared within tenant", among the accounts having the same tenant ID as the tenant ID of the user of the client device 100 from which the acquisition request has been received. The account identifying unit 278 identifies the account for which true is set in Delegator of the attributes, among the extracted accounts.

The procedures of steps S1206 through S1208 are the same as steps S1106 through S1108, and therefore descriptions of these steps are omitted.

(5) Acquisition of Tenant Authentication Key

Figure 13:
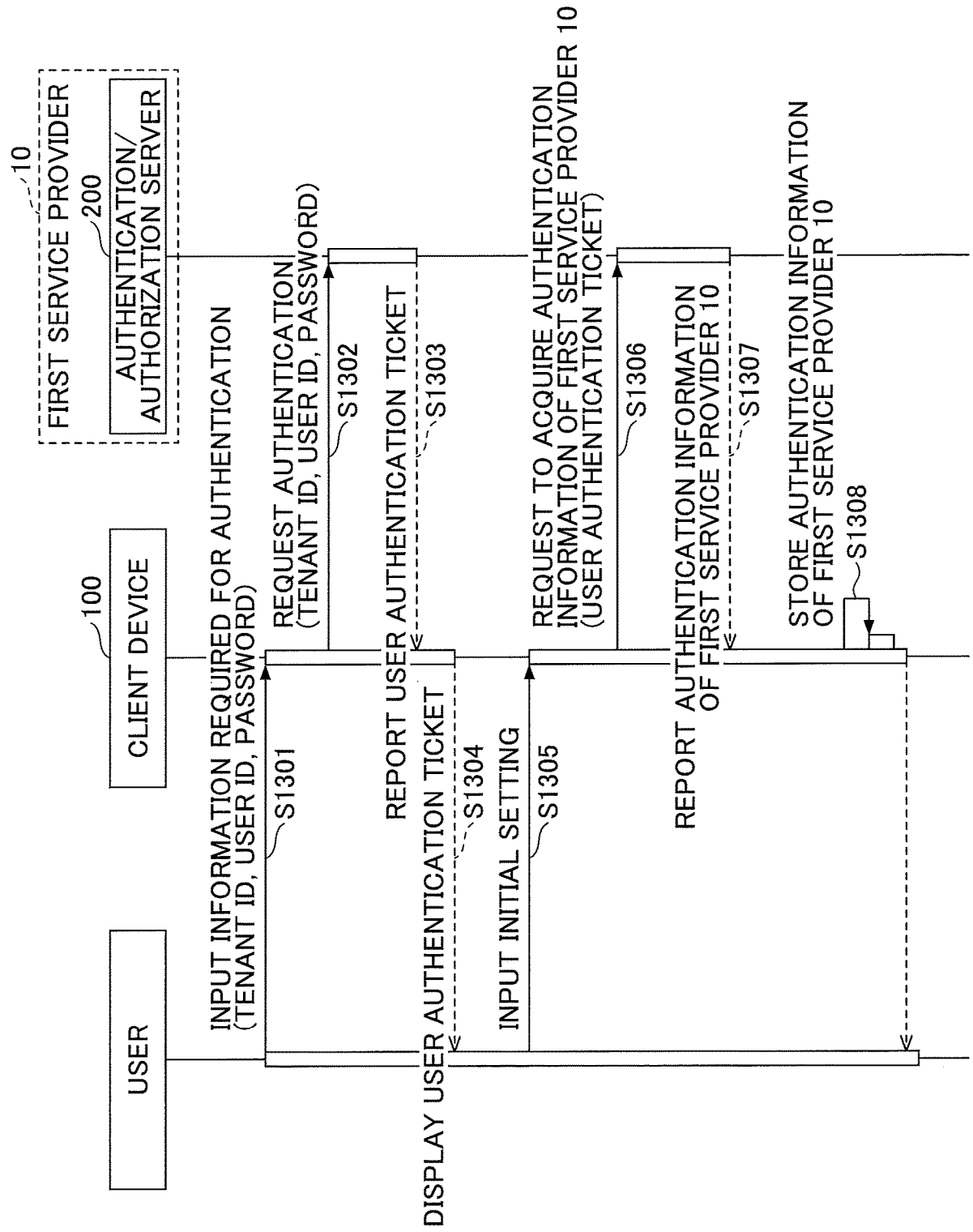
FIG. 13 is a sequence diagram illustrating an example of procedures of acquiring authentication information for a first service provider according to an embodiment of the present invention.

FIG. 13 is a sequence diagram illustrating an example of procedures of acquiring authentication information for the first service provider 10 according to the present embodiment of the present invention.

In step S1301, the inputting/outputting unit 120 of the client device 100 accepts information required for authentication for the first service provider 10 from the user of the client device 100. The information required for authentication includes a tenant ID, a user ID, and a password, etc.

In step S1302, the communicating unit 110 of the client device 100 sends a request for authentication to the authentication/authorization server 200. The request for authentication includes a tenant ID, a user ID, and a password, etc.

In step S1303, the authenticating/authorizing unit 271 of the authentication/authorization server 200 performs an authentication process. When the authentication is successful, the communication unit 290 of the authentication/authorization server 200 reports an authentication ticket of the user to the client device 100.

In step S1304, the inputting/outputting unit 120 of the client device 100 displays the authentication ticket of the user.

In step S1305, the inputting/outputting unit 120 of the client device 100 accepts input of an initial setting relevant to the user's authentication ticket, from the user.

In step S1306, the communicating unit 110 of the client device 100 sends a request to acquire authentication information for the first service provider 10, to the authentication/authorization server 200. The acquisition request includes the user's authentication ticket. Note that the authentication information for the first service provider 10 is referred to as a tenant authentication key.

In step S1307, the communication unit 290 of the authentication/authorization server 200 reports the authentication information for the first service provider 10, to the client device 100.

In step S1308, the storage unit 140 of the storage unit 140 stores the authentication information for the first service provider 10.

<Other>

The authentication/authorization server 200 is an example of a server device. The account identifying unit 278 is an example of an identifier. The communication unit 290 is an example of a receiver, a second transmitter, and a transmitter. The authenticating/authorizing unit 271 is an example of an authenticator.

The communicating unit 110 is an example of a first transmitter, a transmitter, and a receiver. The service provided by the second service provider 20 is an example of an external service.

Operations by the client device 100 may be realized by applications operating in the client device 100.

A storage medium recording the program code of software for realizing the functions of the above embodiments may be supplied to the authentication/authorization server 200 and the client device 100. The authentication/authorization server 200 and the client device 100 may read and execute the program code stored in the storage medium to achieve the above embodiments. In this case, the program code read from the storage medium realizes the functions of the above embodiments. The storage medium storing the program code forms any one of the embodiments. Here, the storage medium is a recording medium or a non-transitory storage medium.

Furthermore, the functions of the above embodiments are not only realized when a computer device reads and executes a program code. According to instructions of the program code, part of or all of the actual processes may be executed by an operation system (OS), etc., operating in the computer device. Furthermore, the functions of the above embodiments may be realized by the processes executed by the OS.

According to one embodiment of the present invention, a client device of a user can efficiently access a service provider, even when the user is sharing an account with other users.

The information processing system, the server device, and the method for processing information are not limited to the specific embodiments described in the detailed description, and variations and modifications may be made without departing from the spirit and scope of the present invention.

What is claimed is:

1. An information processing system comprising:
a client device; and
a server device, wherein
the client device includes:
  a first transmitter configured to transmit, to the server device, an acquisition request to acquire information for connecting to an external device that provides at least one external service, said acquisition request including authentication information for the server device; and
the server device includes:
  a storage configured to store one or more attributes of each of one or more accounts of the at least one external service, and the information for connecting to the external device by using each of the one or more accounts, in association with each other;
  a receiver configured to receive the acquisition request from the client device;
  an identifier configured to identify one or more candidate accounts to be used when the client device receives the at least one external service, the one or more candidate accounts being identified based on one or more information elements and the one or more attributes of each of the one or more accounts, the one or more information elements being included in the acquisition request and identifying the one or more accounts of the at least one external service; and
  a second transmitter configured to transmit, to the client device, the information for connecting to the external device by using the identified one or more candidate accounts,
wherein the server device belongs to a first service provider configured to provide a first service including an image processing by itself and the external device belongs to a second service provider configured to provide the at least one external service in conjunction with the first service provider, and
the server device includes an external cooperation information table that manages a plurality of accounts including the one or more candidate accounts with attribute information indicating whether each of the plurality of accounts is shared within an organization to which a user of the client device belongs.

2. The information processing system according to claim 1, wherein
the one or more information elements include a first organization identifier indicating the organization to which a user of the client device belongs,
the one or more attributes include a second organization identifier indicating an organization to which a user of the one or more accounts belongs and a setting of whether the one or more accounts can be shared by users belonging to a same organization, and
the identifier identifies, as the one or more candidate accounts, the one or more accounts for which the first organization identifier indicating the organization to which the user of the client device belongs matches the second organization identifier indicating the organization to which the user of the one or more accounts belongs, and also for which the one or more attributes include the setting that the one or more accounts can be shared.

3. The information processing system according to claim 2, wherein the client device further includes an inputter/outputter configured to display information of the one or more candidate accounts received from the server device, and accept a selection of an account selected from among the one or more candidate accounts by the user of the client device.

4. The information processing system according to claim 1, wherein
the one or more information elements and the one or more attributes respectively include an application identifier that uses the at least one external service, and
the identifier identifies, as the one or more candidate accounts, the one or more accounts for which the identifier of the application included in the one or more attributes matches the identifier of the application included in the one or more information elements.

5. The information processing system according to claim 1, wherein
the one or more information elements and the one or more attributes respectively include a device identifier of the client device, and
the identifier identifies, as the one or more candidate accounts, the one or more accounts for which the device identifier of the client device included in the one or more attributes matches the device identifier of the client device included in the one or more information elements.

6. The information processing system according to claim 1, wherein
the one or more information elements include a first organization identifier indicating an organization to which a user of the client device belongs,
the one or more attributes include a second organization identifier indicating an organization to which a user of the one or more accounts belongs and information indicating that the one or more accounts are common accounts for the organization to which the user of the one or more accounts belongs, and
the identifier identifies, as the one or more candidate accounts, the one or more accounts for which the first organization identifier indicating the organization to which the user of the client device belongs matches the second organization identifier indicating the organization to which the user of the one or more accounts belongs, and also for which the information indicating that the one or more accounts are the common accounts is set.

7. The information processing system according to claim 1, wherein
the server device further includes an authenticator configured to authenticate the client device in response to the acquisition request, and
the second transmitter transmits the information for connecting to the external device by using the identified one or more candidate accounts, when the authentication is successful.

8. The information processing system according to claim 1, wherein the acquisition request also includes an application identifier of an application in which the one or more candidate accounts of the at least one external service is used.

9. The information processing system according to claim 1, wherein the server device is configured to directly receive the information for connecting to the external device from the external device.

10. The information processing system according to claim 1, wherein the external device is configured to directly provide the information for connecting to the external device to the client device in response to receiving the acquisition request, and the client device is configured to transmit the information for connecting to the external device to the server device.

11. The information processing system according to claim 1, wherein the external cooperation information table includes an account that cannot be shared within the organization.

12. A server device comprising:
   a storage configured to store one or more attributes of each of one or more accounts of at least one external service, and information for connecting to an external device that provides the at least one external service by using each of the one or more accounts, in association with each other;
   a receiver configured to receive an acquisition request to acquire the information for connecting to the external device, from a client device, said acquisition request including authentication information for the server device;
   an identifier configured to identify one or more candidate accounts to be used when the client device receives the at least one external service, the one or more candidate accounts being identified based on one or more information elements and the one or more attributes of each of the one or more accounts, the one or more information elements being included in the acquisition request and identifying the one or more accounts of the at least one external service; and
   a transmitter configured to transmit, to the client device, the information for connecting to the external device by using the identified one or more candidate accounts,
   wherein the server device belongs to a first service provider configured to provide a first service including an image processing by itself and the external device belongs to a second service provider configured to provide the at least one external service in conjunction with the first service provider, and
   the server device includes an external cooperation information table that manages a plurality of accounts including the one or more candidate accounts with attribute information indicating whether each of the plurality of accounts is shared within an organization to which a user of the client device belongs.

13. A method for processing information performed by an information processing system including a client device and a server device, the method comprising:
   transmitting, by the client device to the server device, an acquisition request to acquire information for connecting to an external device that provides at least one external service, said acquisition request including authentication information for the server device;
   storing, by the server device, one or more attributes of each of one or more accounts of the at least one external service, and the information for connecting to the external device by using each of the one or more accounts, in association with each other;
   receiving, by the server device, the acquisition request from the client device;
   identifying, by the server device, one or more candidate accounts to be used when the client device receives the at least one external service, the one or more candidate accounts being identified based on one or more information elements and the one or more attributes of each of the one or more accounts, the one or more information elements being included in the acquisition request and identifying the one or more accounts of the at least one external service; and
   transmitting, by the server device to the client device, the information for connecting to the external device by using the identified one or more candidate accounts,
   wherein the server device belongs to a first service provider configured to provide a first service including an image processing by itself and the external device belongs to a second service provider configured to provide the at least one external service in conjunction with the first service provider, and
   the method further includes managing, in an external cooperation information table, a plurality of accounts including the one or more candidate accounts with attribute information indicating whether each of the plurality of accounts is shared within an organization to which a user of the client device belongs.

* * * * *